G. W. SYLVESTER.
Coupling Joints for Reapers, &c.
No. 143,195. Patented September 23, 1873.
Fig. II.
Fig. III.
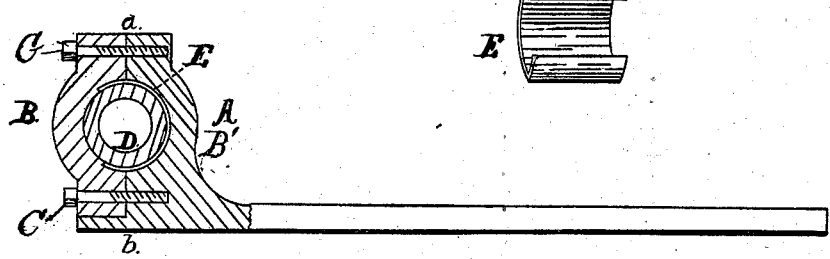

UNITED STATES PATENT OFFICE.

GEORGE W. SYLVESTER, OF PLAIN VIEW, MINNESOTA.

IMPROVEMENT IN COUPLING-JOINTS FOR REAPERS, &c.

Specification forming part of Letters Patent No. 143,195, dated September 23, 1873; application filed July 23, 1873.

*To all whom it may concern:*

Be it known that I, GEORGE W. SYLVESTER, of Plain View, in the county of Wabashaw and State of Minnesota, have invented certain new and useful Improvements in Coupling-Joints for Reapers, Mowers, and other Machinery; and I do hereby declare that the following is a full, clear, and exact description thereof, that will enable others skilled in the art to which it appertains to make and use the same, reference being had to the accompanying drawings and to the letters of reference marked thereon which form a part of this specification.

This invention relates to an improvement in the coupling-joint for reapers, mowers, and other machinery patented to me on the 6th day of May, 1873, and numbered 138,709, the object of which is to render said joint more perfect in operation. This invention consists of a lining made of metal or other suitable material, located between the packing and the adjustable sections of the joint, as will be fully hereinafter described.

In the drawings, Figure 1 represents a longitudinal central section of the coupling with my invention applied thereto; Fig. 2, a detached view of my invention.

A is the reaper-joint; and B B' the two sections of the eye, which are secured together, and adjustable by the set-screws C C. In the eye of the joint is located a circular rubber packing, D, which may be composed of two or more sections, or be made of a single piece.

By means of the set-screws C C the packing may be inserted and clamped tightly, and is rendered adjustable after wear, &c.

In order to prevent the said rubber packing from getting between the joints *a b* of the adjustable sections, I locate, between the latter and the packing, a lining, E', which, in the present instance, consists of metal in the form of a segment of a circle, just sufficiently large to cover the joints *a b* of said sections B B'.

By this means, when the sections are being adjusted, and from other reasons, the rubber D is prevented from entering into said joints *a b*, and the sections may be adjusted with perfect ease and facility.

I claim as my invention—

In combination with the adjustable sections B B' and packing D, the lining E', located between the two, substantially as herein described, for the object specified.

In testimony that I claim the foregoing I have hereunto set my hand this 15th day of July, 1873.

GEORGE W. SYLVESTER.

Witnesses:
R. R. BRIGGS,
THOMAS SIMPSON.